Jan. 27, 1970   TAKEO YAMADA ETAL   3,492,621
HIGH SENSITIVITY PHOTOCONDUCTIVE CELL
Filed June 21, 1967                                2 Sheets-Sheet 1

United States Patent Office 3,492,621
Patented Jan. 27, 1970

3,492,621
HIGH SENSITIVITY PHOTOCONDUCTIVE CELL
Takeo Yamada and Setsuro Kobayashi, Tokyo, Japan, assignors to Nippon Kogaku K.K., Tokyo, Japan, a corporation of Japan
Filed June 21, 1967, Ser. No. 647,702
Claims priority, application Japan, June 24, 1966, 41/40,680
Int. Cl. H01c 7/08
U.S. Cl. 338—19                                    1 Claim

ABSTRACT OF THE DISCLOSURE

A photoconductive cell having a transparent plate provided with closely spaced electrodes, with the spacing being between 1 and 20µ. The electrodes are deposited on a mat surface of the transparent plate, and photosensitive material covers the electrodes and the rest of the mat surface. Dry gas fills a space between the coated plate and a cover glass.

---

The present invention relates to a photocell, and more particularly to a highly photosensitive photoconductive cell.

In accordance with the invention, transparent quartz or Pyrex glass is used for the base plate of the plate of the photoconductive cell, one surface of which is formed with a mat surface, and then an electrode is formed thereon by means of a photographic etching or electronic processing, the base plate serving also as a light receiving window. According to the present invention, electrodes are made in optional forms with minimum spaces between electrodes and minimum widths for each electrode.

The photoconductive surface is made optically flat which plays a role as the light receiving window to provide a photoconductive cell of high sensitivity to be used in an exposure meter, in a light receiving surface switching type exposure meter or in an automatic focusing device.

The present invention will now be described in detail referring to the embodiments shown in the drawing in which.

Figure 1:
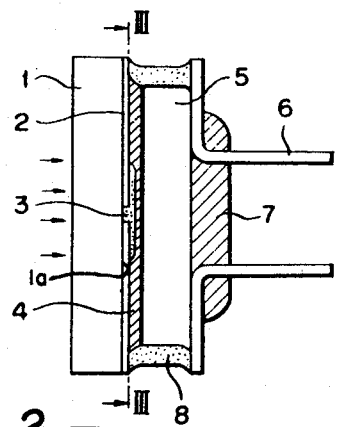
FIG. 1 is a cross sectional view of an embodiment of the present invention.
Figure 3:
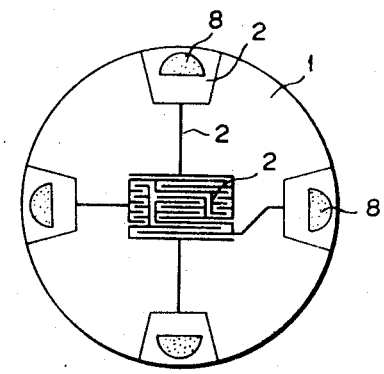
FIGS. 3 and 4 are plan views, respectively, showing electrode arrangements of the photoconductive cell.
Figure 4:
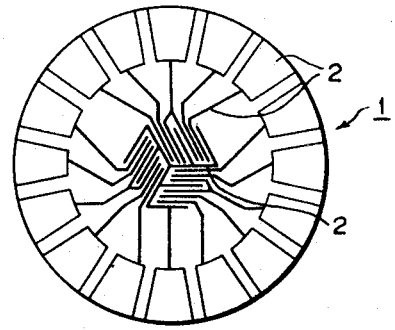
Figure 5A:
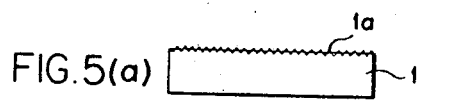
FIGS. 5a to 5h shows a diagram of a process for making the photoconductive cell.
Figure 5B:
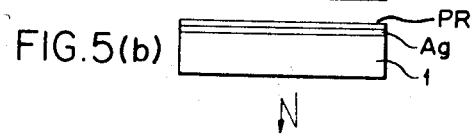
Figure 5C:
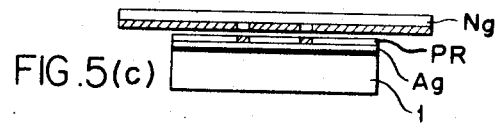
Figure 5D:
Figure 5E:
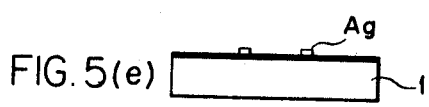
Figure 5F:
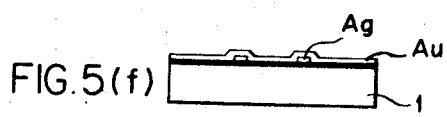
Figure 5G:
Figure 5H:
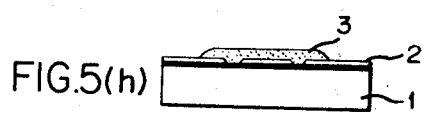

FIG. 1 is a cross sectional view of an embodiment of the photoconductive cell of the present invention in which 1 is a transparent plate which can withstand thermal treatment at a temperature ranging from 600° C. to 700° C. and may be made of quartz or Pyrex glass. The plate 1 has an optical flat surface, and one surface of which forms a mat surface 1a. Electrodes 2 are formed on the mat surface 1a of the transparent plate 1, and are composed of gold or platinum and shaped in the forms shown in FIG. 3 or FIG. 4. Element 3 is a sintered film of photoconductors such as CdS or CdSe and covers those portions of the electrodes which are parallel to each other as illustrated in FIGS. 3 and 4 and the spaces therebetween on the plate 1; 5 is a cover glass cemented to the transparent plate 1, the electrode 2, and the sintered film 3 by an epoxy resin 4. A terminal or lead wire 6 is cemented to the cover glass 5 by an adhesive 7, and fixed to the electrode by an electroconductive covering such as paint 8. The mat surface 1a of the plate 1 assists to tightly form the electrode 2 thereon.

Figure 2:
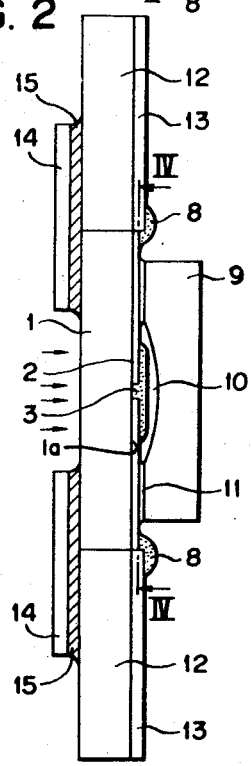
FIG. 2 is a cross sectional view of another embodiment of the present invention.

FIG. 2 is another embodiment of the invention in which the elements 1, 2, and 3 are the same as in the case of FIG. 1. A cover glass 9 is provided having a concave portion 10 and secured to the transparent plate 1 and the electrode 2 by a low melting point glass or thermosetting resin 11; a dry gas, such as dry air or nitrogen, being sealed in the space formed by the concave portion 10; 12 is a printed circuit base plate, and has a copper foil 13 formed in any optional form as terminals. The base plate 12 is fixed to the transparent plate 1 by an adhesive 15 with the aid of reinforcing washer 14. Conductive paint 8 connects the electrode 2 and the copper foil 13.

FIGS. 5a to 5h show the step-by-step process for producing the transparent plate 1, the electrode 2, and the sintered film 3 of the photoconductor. In step 5a, the quartz plate or transparent crystal plate 1 is formed with a mat surface 1a on one surface of the plate 1, while step 5b of the process shows the plate 1 having a silver film Ag deposited on the mat surface 1a and a photoresist film PR on the silver film. In step 5c, a photographic plate Ng, which is a mask having the light stopping portions formed similarly to the configurations of the electrodes, is layed over the photo-resist film PR and exposed. In step 5d, the photo-resist film PR forms the exposed image on the film Ag after development using a developer specific to the photo-resist film PR whereby the unexposed portion of the film PR is removed. Step 5e of the process shows an image formed by the silver film Ag on the transparent plate 1 after removing that portion of the silver film not under the photo-resist film PR by the conventional weak acid treatment using such as iodine potassium and thereafter a solvent treatment for removing the photo-resist film PR. In step 5f of the process, a gold film Au is vacuum deposited over the total surface of the transparent plate including the silver image and step 5g illustrates the electrode 2 made of the gold film on the plate 1 after a part thereof on the silver image is peeled off along with the silver base Ag by shaking the transparent plate in an acid bath, for example, concentrated nitric acid which enters the pin holes in the gold film to remove the silver film Ag and the overlaying gold film Au, the removed portions of the two films leaving cavities, or the spaces between the electrodes 2. Step 5h of the process illustrates the photoconductor 3 sintered on the electrodes 2 and on the transparent plate 1, covering the electrodes and spaced therebetween. In this embodiment a photo-resist film PR is used.

The photocells resulting from the foregoing processes of photographically or electronically etching the electrodes may have electrode spacings as small as 1 to 20µ. By conventional methods, as for example through vacuum evaporation, spacings of from 100 to 300µ are obtained, while spacings of 200 to 500µ are possible by means of silk screen method. The photoconductive cells of the present invention may have electrodes of any optional shape with a practical minimum spacing of the electrodes ranging from 1 to 20µ.

As stated above, by the first step of the process, one surface of the transparent plate is formed with a mat surface of about No. 1500 sand polished, and consequently, the gold film Au is firmly deposited on the surface and there is no danger that this film will be peeled off in the process as carried out later on.

In accordance with the present invention, it is possible to obtain extremely fine miniature electrodes of higher sensitivity than the conventional electrodes having the same light receiving area. In addition, it is possible to have the light receiving portion, or light incident window of the resultant cell, optically flat thereby improving the precision of the lens projection photometry or automatic focussing adjustment. In addition to these advantages, the deterioration of the photoconductive element due to humidity and possible physical damage thereto is minimized to a large degree by the practice of the present invention.

What is claimed is:
1. Photocell comprising
a base plate of a thermal-resistant, transparent material, one side of the plate being optical flat and the other side of the plate having a mat surface,
spaced electrodes on the mat surface, the spacings between the electrodes being between 1 and 20μ,
a photosensitive film covering the electrodes and the mat surface of the plate between the electrodes,
a cover glass for the mat surface side of the plate secured to the electrodes and the photosensitive film,
a concave surface in the cover glass forming with the mat surface of the plate a space for the photosensitive film,
a dry gas filling said space,
terminals for the electrodes secured to the cover glass, and
an electrical conductive covering connecting the terminals and the electrodes.

References Cited

UNITED STATES PATENTS

| | | | |
|---|---|---|---|
| 2,055,017 | 9/1936 | Praetorius et al. | 338—19 |
| 2,711,464 | 6/1955 | Anderson et al. | 338—19 |
| 3,177,576 | 4/1965 | Kuzminski | 338—19 |
| 3,307,983 | 3/1967 | De Haan et al. | 117—211 X |

REUBEN EPSTEIN, Primary Examiner

U.S. Cl. X.R.

29—620; 117—211; 338—15